United States Patent
Farnsworth

[11] Patent Number: 6,039,311
[45] Date of Patent: Mar. 21, 2000

[54] AUTOMOTIVE DAMPING DEVICE

[76] Inventor: Albert W. Farnsworth, P.O. Box 423, Newark Valley, N.Y. 13811

[21] Appl. No.: 09/002,787

[22] Filed: Jan. 5, 1998

[51] Int. Cl.[7] .................................................. B60G 13/00
[52] U.S. Cl. .......................... 267/227; 267/32; 188/266.2; 280/124.112
[58] Field of Search ................................ 267/227, 24, 31, 267/32; 188/266.2; 322.2; 280/124.112, 124.163

[56] References Cited

U.S. PATENT DOCUMENTS

| 2,264,111 | 11/1941 | Briggs | 188/277 |
|---|---|---|---|
| 3,664,452 | 5/1972 | Schaeff | 267/31 |
| 3,782,753 | 1/1974 | Sweet et al. | 267/31 |
| 3,850,445 | 11/1974 | Borns et al. | 267/31 |
| 4,089,544 | 5/1978 | Raidel | 267/31 |
| 4,966,387 | 10/1990 | White, IV | 267/31 |
| 5,337,864 | 8/1994 | Sjorstrom | 188/266.2 |
| 5,392,882 | 2/1995 | Mackovjak et al. | 188/266.2 |
| 5,636,857 | 6/1997 | Tandy, Jr. et al. | 267/31 |

*Primary Examiner*—Matthew C. Graham
*Assistant Examiner*—Robert A. Siconolfi
*Attorney, Agent, or Firm*—Salzman & Levy

[57] ABSTRACT

A damping system for reducing or substantially eliminating leaf spring chatter experienced in a vehicle, especially when towing another vehicle, during start-up. The damping system comprises a pair of hydraulic cylinder-pistons that cushion the deflections of each leaf spring resulting from axle housing backlash during the starting of the vehicle.

12 Claims, 3 Drawing Sheets

AUTOMOTIVE DAMPING DEVICE

FIELD OF THE INVENTION

The present invention relates to automobiles and other land vehicles and, more particularly, to a damping device to prevent rear end leaf spring chatter, when starting the automobile under load conditions.

BACKGROUND OF THE INVENTION

It has been observed that many vehicles experience a chattering of their rear end leaf springs, when the van, truck, camper or automobile is started, in the forward or rear direction, especially while pulling a trailer or other load. The chattering of the leaf springs, which is also referred to as "spring windup", is caused by the backlash of the axle housing. At the start of vehicle moving under power, the rear axle begins to spin rapidly, causing the axle housing to rotate a few degrees against its mountings. The rotating housing causes pressure upon the leaf springs, which rapidly deflect, resulting in a chattering condition. The same condition exists with air or coil spring suspension.

The present invention reflects the discovery that a damping mechanism for damping the spring deflections can ensure a quieter start of the vehicle. The damping mechanism of this invention comprises a two-way, hydraulic, piston-cylinder unit. The unit is mounted to each rear end leaf spring via a pivotable bracket that is clamped about the spring. By changing the mounting brackets on the axle, the system can be used on air or coil spring suspension. The piston of the damping unit is attached at the pivotal end of the bracket. The damping mechanism is pivotally mounted to the frame of the vehicle via a clevis pin arrangement.

As the leaf springs are caused to deflect, the piston is caused to act against the fluid in the cylinder. The flow of the fluid is controlled at each port end of the cylinder by a solenoid-actuated cartridge valve. The solenoids are wired into the vehicle electrical system, and are each manually or automatically actuated by an electrical switch. The electrical switch is wired into the system so that the solenoid and cartridge valve is in a normally open position. Upon the deflection of the springs, a strain gauge, or optical sensor disposed upon each of the springs generates a signal to actuate the switch. The switch can also be actuated by sensing the speed of the drive shaft, a transmissional change from first gear, or a limit switch disposed upon the axle housing that senses the axle housing rotation. An optional small hole or orifice in the piston allows a gradual release of fluid in the cylinder, which may otherwise quickly damp the rapidly deflecting springs. The fluid flows to a reservoir and back to the cylinder under vacuum.

SUMMARY OF THE INVENTION

In accordance with the present invention, there is provided a damping mechanism for preventing leaf spring chattering during vehicle start-up under load conditions. The damping mechanism comprises a two-way, hydraulic, piston-cylinder unit. The unit is mounted to each leaf spring via a pivotable bracket that is attached thereto by two clamps. The piston of the damping unit is connected to the pivotal end of the bracket. The damping mechanism is pivotally mounted to the frame of the vehicle via a clevis pin.

As the leaf springs are caused to deflect, the piston is caused to act against the fluid in the cylinder. The flow of the fluid is controlled at each port end of the cylinder by a solenoid-actuated cartridge valve. The solenoids are wired into the vehicle electrical system, and are each manually or automatically actuated by an electrical switch. The electrical switch is wired into the system in a normally open position. Upon the deflection of the springs, a strain gauge, or optical sensor disposed upon each of the springs generates a signal to actuate the switch. The switch can also be actuated by sensing the speed of the drive shaft, a transmissional change from first gear, or a limit switch disposed upon the axle housing that senses the axle housing rotation. A small hole or orifice in the piston allows a gradual release of fluid in the cylinder, which otherwise quickly damps the rapidly deflecting springs. The fluid flows to a reservoir and back to the cylinder under vacuum.

It is an object of this invention to provide a means to prevent or substantially eliminate the chattering of the rear end leaf springs of a vehicle at start-up under load conditions.

It is another object of the invention to provide means by which "spring windup" can be effectively controlled when a vehicle is towing a load.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components bear the same designation and numbering throughout the figures.

DESCRIPTION OF THE PREFERRED EMBODIMENT

Generally speaking, the invention features a damping system for preventing or substantially eliminating leaf spring chatter experienced in a vehicle, especially when towing another vehicle during start-up. The damping system comprises a pair of hydraulic cylinder-pistons that cushion the deflection of each leaf spring resulting from axle housing backlash when starting the vehicle in the forward or rear direction.

Figure 1:
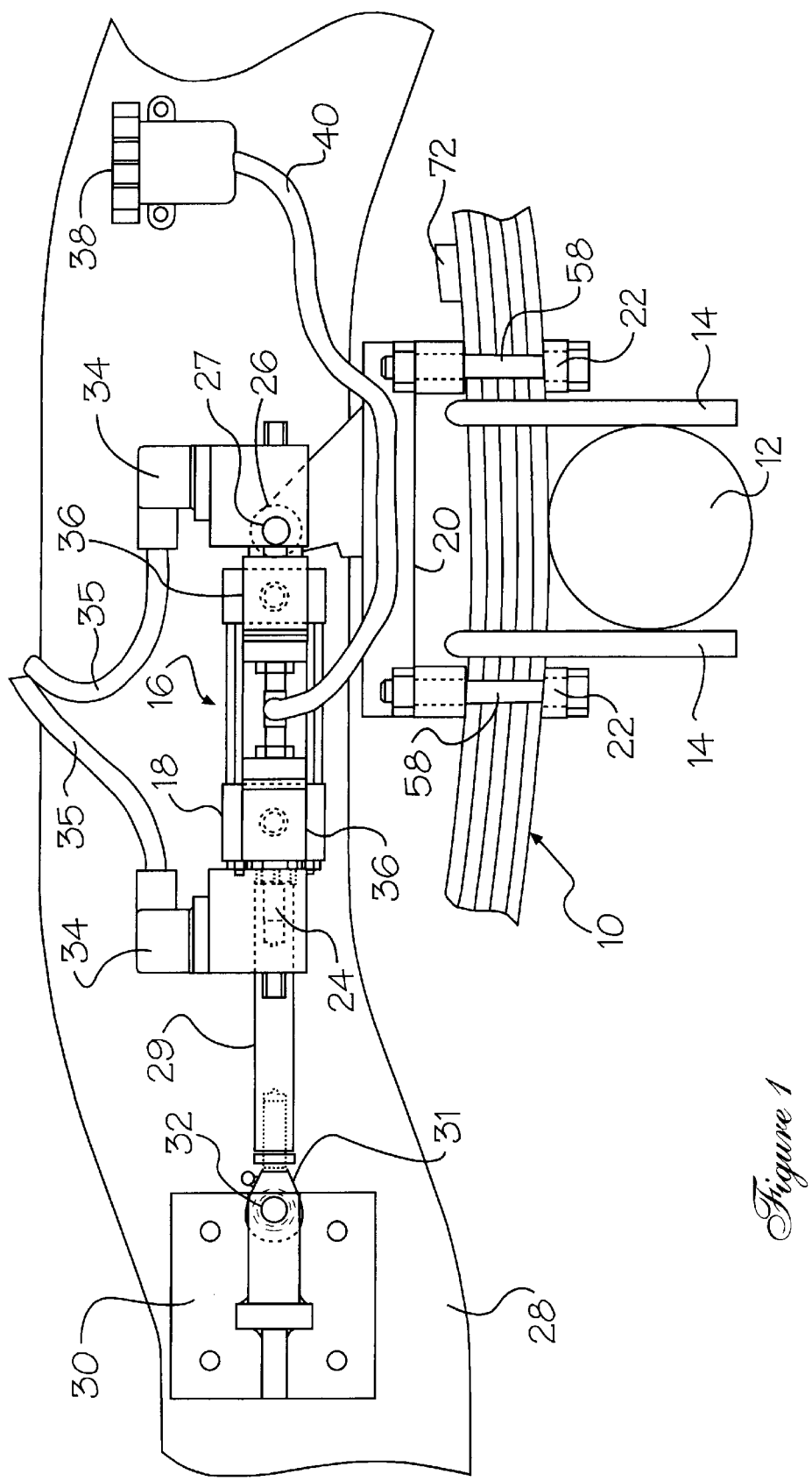
FIG. 1 illustrates a plan view of the damping assembly of this invention.

Now referring to FIG. 1, a leaf spring 10 of an automobile is shown in its relationship to axle housing 12. The leaf spring 10 is attached to the axle housing 12 by means of straps 14. A damping mechanism 16 for preventing leaf spring chattering during vehicle start-up under load conditions comprises a two-way, hydraulic, piston-cylinder unit 18. The unit 18 is mounted to each leaf spring 10 via a pivotable bracket 20 that is attached thereto by two rectangular clamps 22. The piston (not shown) of the cylinder 18 is attached to piston rod 24 that is connected to rod 29 on the left end, and is pivotally connected to the pivotal end extension member 26 of the bracket 20, via pivot pin 27. The damping mechanism 16 is pivotally mounted to the frame 28 of the vehicle via the rod 29 that pivotably connects to frame bracket 30, by means of the attached rod end 31 and clevis pin 32.

Figure 5:
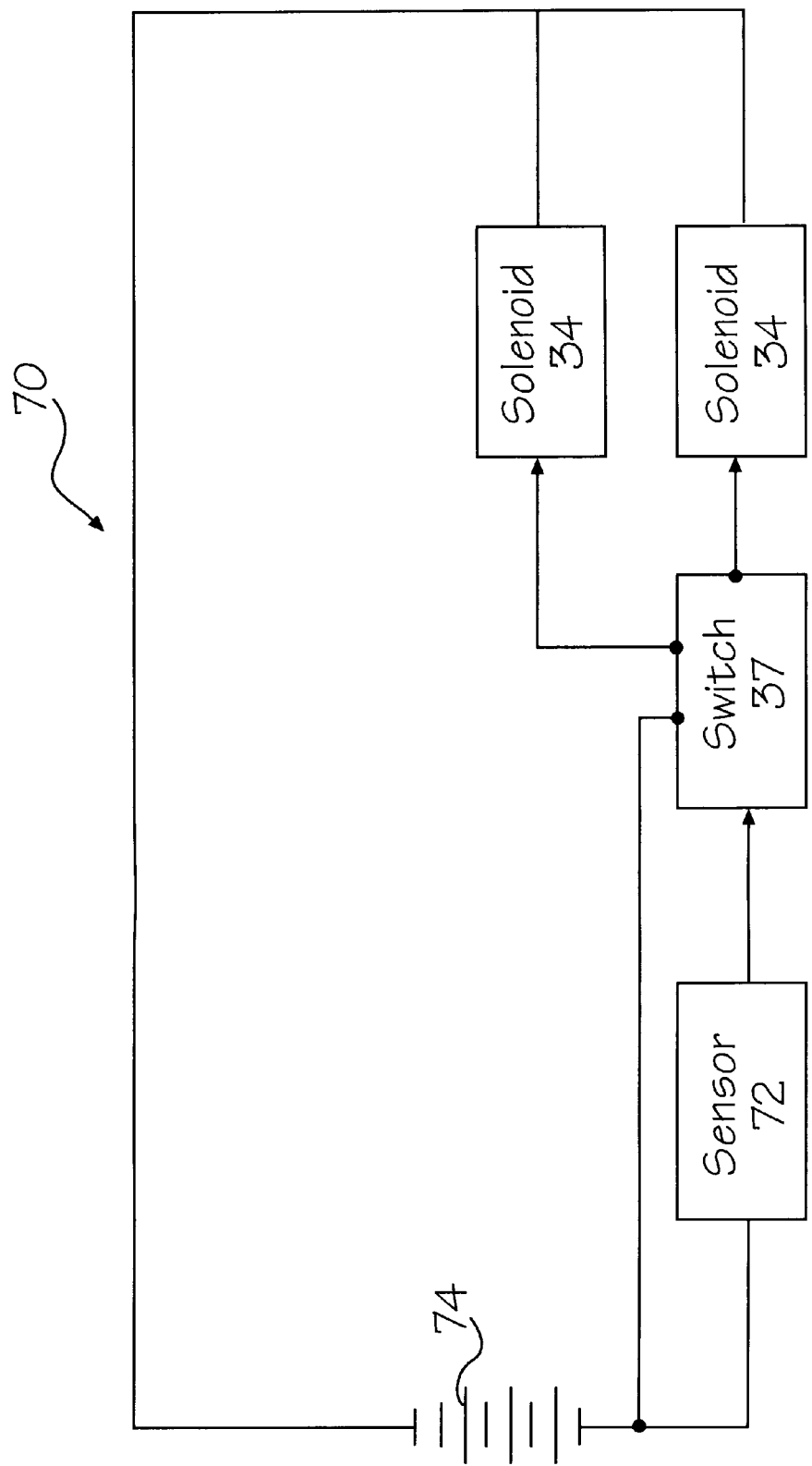
FIG. 5 depicts an electrical schematic diagram of the system for automatically actuating the damping mechanism of this invention.

As the leaf springs 10 are caused to deflect, the piston is caused to act against fluid (not shown) in the cylinder 18. The flow of the fluid is controlled at each port end of the cylinder 18 by a solenoid 34 that actuates its respective cartridge valve 36. The valves 36 are each connected through line 70 to a T-junction into the vehicle electrical system (shown in FIG. 5), and are each manually, or preferably, automatically actuated by an electrical switch 37. The electrical switch 37 is wired into the system in a normally open position. Upon the deflection of the springs 10, a strain gauge or optical sensor 72 disposed upon each of the springs 10, sends a signal to actuate the switch 37. The switch 37 can also be actuated by sensing the speed of the drive shaft, a transmissional change from first gear, or by a limit switch (not shown) disposed upon the axle housing 12 that closes with axle housing rotation. An optional small hole or orifice in the piston allows a gradual release of fluid in the cylinder 18, which otherwise quickly damps the rapidly deflecting springs 10. The fluid flows to a reservoir 38 via hydraulic line 40, and back to the cylinder 18 under vacuum. The reservoir 38 is needed due to the unequal amount of fluid on each side of the piston. The solenoids 34 that electrically control the valves 36 are connected to the switch 37.

Figure 2:
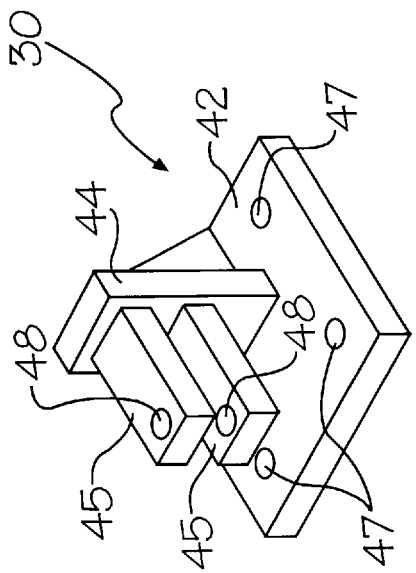
FIG. 2 depicts a perspective view of a frame bracket for clamping the piston of the damping cylinder to the frame of the vehicle.

Referring now also to FIG. 2, a perspective view of the frame bracket 30, is illustrated. The frame bracket 30 comprises a rectangular base 42 and a perpendicularly extending column member 44. Two rectangular flanges 45 perpendicularly extend from column member 44. The base 42 is designed to be bolted to the automobile frame 28 (FIG. 1) by bolts that fit the corner holes 47. The rod end 31 fits between the flanges 45 and is bolted thereto via holes 48. In this manner, the damping unit 16 is attached to the automobile frame 28.

Figure 3:
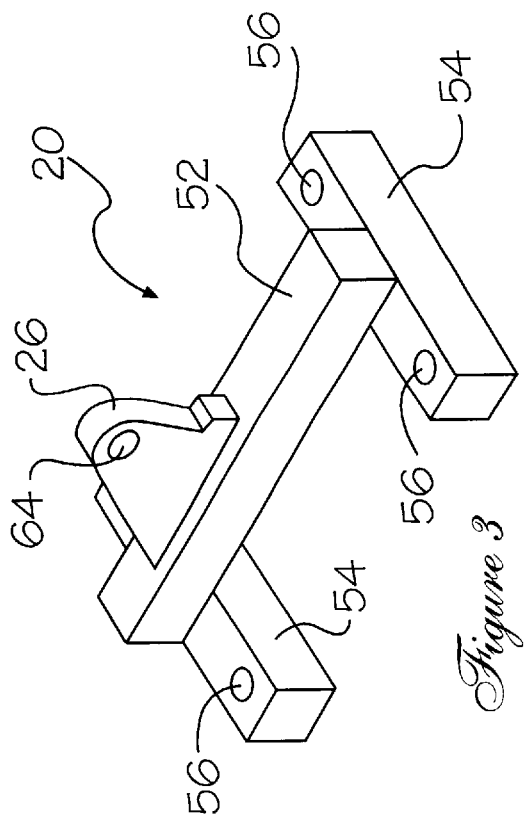
FIG. 3 shows a perspective view of a spring bracket for clamping each leaf spring to the piston of the damping cylinder.
Figure 4:
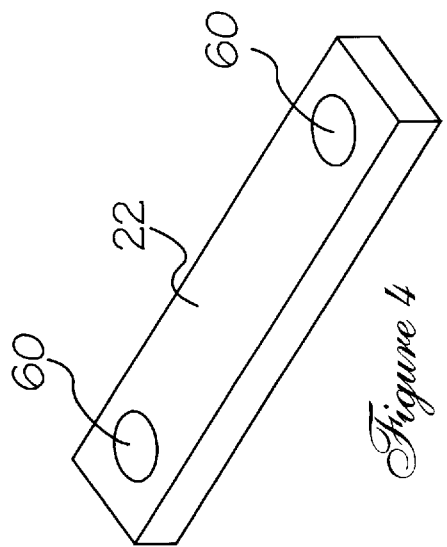
FIG. 4 illustrates a perspective view of an end clamp for attaching the spring bracket to the leaf springs of the vehicle.

Referring to FIG. 3, a perspective view of the spring end bracket 20 is shown. The spring end bracket 20 comprises an elongated arm 52 that carries two end cross bars 54. The spring end bracket 20 attaches to the leaf springs 10 via the two end cross bars 54, which are bolted to the leaf springs 10 through holes 56, using bolts 58, as shown in FIG. 1, and two lower spring clamps 22, illustrated in FIG. 4. The bolts 58 pass through, and are affixed to, the lower spring clamps 22 via end holes 60.

The spring end bracket 20 is connected to the damping unit 16 via the pivotable end member 26 which is pivotally affixed to the damping unit 16 by pivot pin 27 that passes through hole 64 of the pivotable end member 26, as shown.

Referring again to FIG. 5, an electrical diagram 70 is shown for each damping unit 16 depicted in FIG. 1. The automotive battery 74 supplies current to the solenoids 34 to actuate each damping unit 16 when sensor 72 generates a signal to close the normally open switch 37. As aforementioned, the sensor 72 can be a strain gauge attached to the leaf spring 10, or an optical sensor adjacent the leaf spring 10 that detects spring movement.

It is also possible to provide a limit switch (not shown) in place of sensor 72 and switch 37. The limit switch is disposed on the axle housing (not shown), and senses the axle housing rotation. The limit switch allows current to pass from the battery 74 to solenoids 34 when the axle housing rotates and deflects the leaf spring 10.

Unlike other hydraulic systems that use pump pressure to move the cylinder pistons, no pump or operating pressure is used in the damping mechanism 16 of this invention. The piston in the cylinders 18 moves oil from one side of the cylinders to the other side of the cylinders. One side forces oil out of the port, which creates a partial vacuum on the opposite side of the cylinder chamber. A damping effect is created when the flow of oil is blocked or restricted by the cartridge valves 36. In this manner, the deflecting leaf springs 10 are damped by the damping mechanism 16 of the invention. The unit 16 operates with automatic transmission fluid, which is temperature insensitive. The solenoid-operated cartridge valves 36 may also be solenoid-operated directional valves.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A damping mechanism for reducing or preventing leaf spring chattering during vehicle start-up, said vehicle comprising a frame and a pair of leaf springs, said damping mechanism comprising:

a pair of two-way, hydraulic, piston-cylinder units, each one of said pair of hydraulic, piston-cylinder units being pivotally mounted to a respective leaf spring of said pair of leaf springs of said vehicle and said frame of said vehicle, each of said two-way, hydraulic, piston-cylinders comprising a piston disposed within a cylinder for moving hydraulic fluid from one side of said cylinder to an opposite side of said cylinder;

a pair of electrically operated valves in communication with the respective cylinder of each pair of said two-way, hydraulic, piston-cylinder units, for controlling movement of said hydraulic fluid in each respective cylinder, in order to create a damping effect as the leaf springs deflect; and an electrical switch, operatively connected to each of said electrically operated valves, for actuating each of said electrically operated valves a sensor disposed adjacent each of said leaf springs, said sensor detecting deflection of said leaf spring and, in response thereto, generating a signal to actuate said electrical system.

2. The damping mechanism for reducing or preventing leaf spring chattering in accordance with claim 1, further comprising:

a limit switch disposed adjacent an axle housing of said vehicle for sensing axle housing rotation as a function of leaf spring deflection, said limit switch actuating each of said electrically operated valves.

3. The damping mechanism for reducing or preventing leaf spring chattering in accordance with claim 1, wherein said sensor adjacent each of said leaf springs comprises a strain gauge.

4. The damping mechanism for reducing or preventing leaf spring chattering in accordance with claim 1, wherein said sensor adjacent each of said leaf springs comprises an optical sensor.

5. The damping mechanism for reducing or preventing leaf spring chattering in accordance with claim 1, wherein said electrically operated valves comprise solenoid-actuated cartridge valves.

6. The damping mechanism for reducing or preventing leaf spring chattering in accordance with claim 1, wherein said electrically operated valves comprise solenoid-actuated directional valves.

7. A damping mechanism for reducing or preventing leaf spring chattering in a vehicle, said vehicle comprising a frame and a pair of leaf springs, said damping mechanism comprising:

- a pair of two-way, hydraulic, piston-cylinder units, each one of said pair of hydraulic, piston-cylinder units being movably mounted to a respective leaf spring of said pair of leaf springs of said vehicle and said frame of said vehicle, each of said two-way, hydraulic, piston-cylinders comprising a piston disposed within a cylinder for moving hydraulic fluid from one side of said cylinder to an opposite side of said cylinder;
- a reservoir operatively connected to each of said pair of two-way, hydraulic, piston-cylinder units for receiving hydraulic fluid from each of said hydraulic piston-cylinder units;
- a pair of electrically operated valves in communication with the respective cylinder of each pair of said two-way, hydraulic, piston-cylinder units, for controlling movement of said hydraulic fluid in each respective cylinder, in order to create a damping effect as the leaf springs deflect;
- an electrical switch, operatively connected to each of said electrically operated valves, for actuating each of said electrically operated valves; and
- a sensor disposed adjacent each of said leaf springs, said sensor detecting deflection of said leaf spring and, in response thereto, generating a signal to actuate said electrical switch.

8. The damping mechanism for reducing or preventing leaf spring chattering in accordance with claim 7, further comprising:

- a limit switch disposed adjacent an axle housing of said vehicle for sensing axle housing rotation as a function of leaf spring deflection, said limit switch actuating each of said electrically operated valves.

9. The damping mechanism for reducing or preventing leaf spring chattering in accordance with claim 9, wherein said sensor adjacent each of said leaf springs comprises a strain gauge.

10. The damping mechanism for reducing or preventing leaf spring chattering in accordance with claim 9, wherein said sensor adjacent each of said leaf springs comprises an optical sensor.

11. The damping mechanism for reducing or preventing leaf spring chattering in accordance with claim 9, wherein said electrically operated valves comprise solenoid-actuated cartridge valves.

12. The damping mechanism for reducing or preventing leaf spring chattering in accordance with claim 9, wherein said electrically operated valves comprise solenoid-actuated directional valves.

* * * * *